United States Patent
Robitaille

(10) Patent No.: US 11,077,651 B2
(45) Date of Patent: Aug. 3, 2021

(54) METHOD AND PROCESS TO LAMINATE SUBSTRATES USING AN ADHESIVE TAPE

(71) Applicant: MAROTECH INC., St-Augustin de Desmaures (CA)

(72) Inventor: Martin Robitaille, St-Augustin de Desmaures (CA)

(73) Assignee: MAROTECH INC.

( * ) Notice: Subject to any disclaimer, the term of this patent is extended or adjusted under 35 U.S.C. 154(b) by 0 days.

(21) Appl. No.: 16/666,929

(22) Filed: Oct. 29, 2019

(65) Prior Publication Data

US 2020/0114636 A1 Apr. 16, 2020

Related U.S. Application Data

(63) Continuation-in-part of application No. 15/321,557, filed as application No. PCT/CA2015/050616 on Jul. 2, 2015, now abandoned.

(30) Foreign Application Priority Data

Jul. 3, 2014 (WO) ................ PCT/CA2014/050633

(51) Int. Cl.
*B32B 37/00* (2006.01)
*B32B 38/00* (2006.01)
(Continued)

(52) U.S. Cl.
CPC .............. *B32B 37/06* (2013.01); *B32B 37/08* (2013.01); *B32B 37/1207* (2013.01);
(Continued)

(58) Field of Classification Search
CPC .................................................. B32B 38/185
See application file for complete search history.

(56) References Cited

U.S. PATENT DOCUMENTS

| 2,294,347 A | 8/1942 | Bauer et al. |
| 3,885,559 A | 5/1975 | Economou |

(Continued)

FOREIGN PATENT DOCUMENTS

| EP | 2014734 | 1/2009 |
| EP | 2072595 | 6/2009 |

OTHER PUBLICATIONS

International Search Report dated Jul. 3, 2014, in the corresponding patent application PCT/CA2014/050633, 4 pages.

(Continued)

*Primary Examiner* — Linda L Gray
(74) *Attorney, Agent, or Firm* — Brouillette Legal Inc.; Robert Brouillette

(57) ABSTRACT

The present invention discloses a method and process to laminate packaging substrates using an adhesive tape. The tape has a first heat activated adhesive which is activatable at a first temperature and a second heat activated adhesive which is activatable at a second temperature and both of which are alternatively coated on at least one surface of the tape. The method consists of laminating this aforementioned tape to a packaging substrate by following the process of: placing this tape in or on a laminating machine over the packaging substrate, heating the tape at least to the second temperature while making contact with the packaging substrate, cooling the packaging laminate until the second heat activated adhesive is set and cutting a predetermined portion of the packaging laminate before a second adhesive occurs between the tape and the packaging laminate.

20 Claims, 4 Drawing Sheets

(51) Int. Cl.
  *B32B 37/06*   (2006.01)
  *B32B 37/08*   (2006.01)
  *C09J 123/08*  (2006.01)
  *B32B 37/12*   (2006.01)
  *B32B 38/18*   (2006.01)

(52) U.S. Cl.
  CPC . *C09J 123/0853* (2013.01); *B29C 2793/0054* (2013.01); *B32B 38/0004* (2013.01); *B32B 38/185* (2013.01); *B32B 2037/1215* (2013.01); *Y10T 156/1064* (2015.01); *Y10T 156/1082* (2015.01)

(56) References Cited

U.S. PATENT DOCUMENTS

| | | | |
|---|---|---|---|
| 5,730,831 A * | 3/1998 | Jensen, Jr. | B65B 51/067 |
| | | | 156/468 |
| 6,670,008 B1 | 12/2003 | Ognissanti et al. | |
| 2002/0108564 A1 | 8/2002 | Gruenewald et al. | |
| 2009/0291279 A1 | 11/2009 | Schroeer et al. | |
| 2010/0024954 A1* | 2/2010 | Ito | B32B 38/185 |
| | | | 156/64 |
| 2012/0273561 A1 | 11/2012 | Irvin et al. | |
| 2013/0184384 A1 | 7/2013 | Liu et al. | |
| 2015/0111010 A1 | 4/2015 | Nash et al. | |

OTHER PUBLICATIONS

International Search Report dated Sep. 22, 2015, in the corresponding patent application PCT/CA2015/050616, 3 pages.

* cited by examiner

METHOD AND PROCESS TO LAMINATE SUBSTRATES USING AN ADHESIVE TAPE

CROSS-REFERENCE TO RELATED APPLICATIONS

The present patent application claims the benefits of priority of commonly assigned PCT Patent Application No. PCT/CA2014/050633 entitled "Packaging Tape with Increase Performance" and filed at the Canadian Intellectual Property Office on Jul. 3, 2014, the content of which is incorporated herewith by reference and is a Continuation-in-part of U.S. National Phase application Ser. No. 15/321,557 filed on Dec. 22, 2016.

FIELD OF THE INVENTION

The present invention generally relates to an adhesive tape such as tapes, or ribbons, webs, strings, yarns or the like which, for the purposes of this application, are generally referred to herein as "tape", with improved performance when the tape is being unwound at a laminating machine such as a corrugating machine or press. One aspect of the present invention is to increase the operating speed of the tape in the laminating machine.

BACKGROUND OF THE INVENTION

Reinforcing or tear tapes have been used for many years in modern packaging as an aid to maintain structural integrity or as an easy open feature in boxes, packages and/or containers. The packaging industry has made huge productivity improvements over the years with the results that laminating machines are operating at increased speeds. The reinforcing or tear tapes are heat activated, and the heat present in the laminating machines is activating the adhesion of the tapes so they will bond to the substrate. As the tapes reach the end of the laminating machines, the tapes also need to be cooled down so the adhesive will set before the packaging is cut from the laminate.

U.S. Pat. No. 2,294,347 (Bauer et al.) and U.S. Pat. No. 3,885,559 (Economou) teach sealing tapes comprising a cloth substrate or backing and an adhesive layer wherein the adhesive layer has alternating areas of different bond strength. US published application no. 2015/0111010 (Nash) and U.S. Pat. No. 6,670,008 (Ognissanti) also disclose tapes having alternating areas of different bond strength. These tapes are not adapted to be used in laminating machines.

Indeed, if the adhesive of the tapes is not set properly, the tapes will not bond the laminated product properly, which will result in defects in the laminated products. An operating temperature envelope in the performance of the tapes in the laminating machine is then a critical factor, as the tapes have to be heated enough to provide the required adhesion to the substrate and at the same time cooled enough at the exit of the laminating machine so the adhesion of the tapes will be set, one working against the other.

As the laminating machines' speed is increasing, the temperature operating envelope of the tapes is becoming too small and either the tapes are not bonded properly to the substrate, or the tapes are not set at the end of the laminating machines both of which leads to defects to the laminated products.

Thus, there is a need for improved tapes and laminating methods where the adhesive of the tapes is properly set and where the tapes will bond the laminated product properly, which will result in diminishing defects in the resulting laminated products.

SUMMARY OF THE INVENTION

The aforesaid and other objectives of the present invention are realized by generally providing an adhesive tape adapted to a process which laminates, corrugates or presses in order to reinforce a packaging or as an easy open feature for packaging.

The invention relates to an adhesive tape, said system composed of a core structure and an adhesive layer coated at least on one surface defined by the core structure, wherein the adhesive layer consists of at least two different heat-activated adhesive materials located in an alternative sequence over at least one surface of the core structure, the heat-activated adhesive materials being activated at different temperatures.

The invention is also directed to the use of the adhesive tape as disclosed herein, in a laminating, corrugating or press process to reinforce a packaging or as an easy open feature for packaging.

What is presented is a method and process for laminating a substrate using the adhesive tape as disclosed herein, the process comprising the steps of:

a. positioning in or on a laminating machine the adhesive tape at a given position over the packaging substrate to be laminated;

b. heating the tape at least to the second temperature while contacting the tape with the packaging substrate to form a packaging laminate;

c. cooling the packaging laminate for setting said first heat activated adhesive to provide a first adhesion between the adhesive tape and the packaging substrate; and d. cutting a predetermined portion of the packaging laminate before a second adhesion occurs between the tape and the packaging laminate when the second heat activated adhesive is set to permanently fix the tape to the substrate.

The present invention allows the increase of the operating temperature envelope of operation of the tapes in the laminating machine, so the tapes will provide the required adhesion to the substrate while still be sufficiently set at the exit of the laminating machine.

With this invention, more than one heat activated adhesive formulations are used to bond the tapes to the substrate. The tapes are constructed with adhesives which are applied in a layer to the surface of the tapes in alternative sequences so that adhesives with different properties are spaced one after the other over the length of the tapes. As the tapes are processed in the laminating machines, some of the adhesives will be heat activated with enough operating range that the tapes will be have the proper adhesion to the substrate in any operating conditions, and some of the adhesives will be formulated so that they will be set at the exit of the laminating machines also at any operating conditions of the laminating machines. Hence the tapes will have a much larger operating temperature envelope under a very large range of operating conditions in the laminating machines.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which.

DETAILED DESCRIPTION OF PREFERRED EMBODIMENTS

Figure 1:
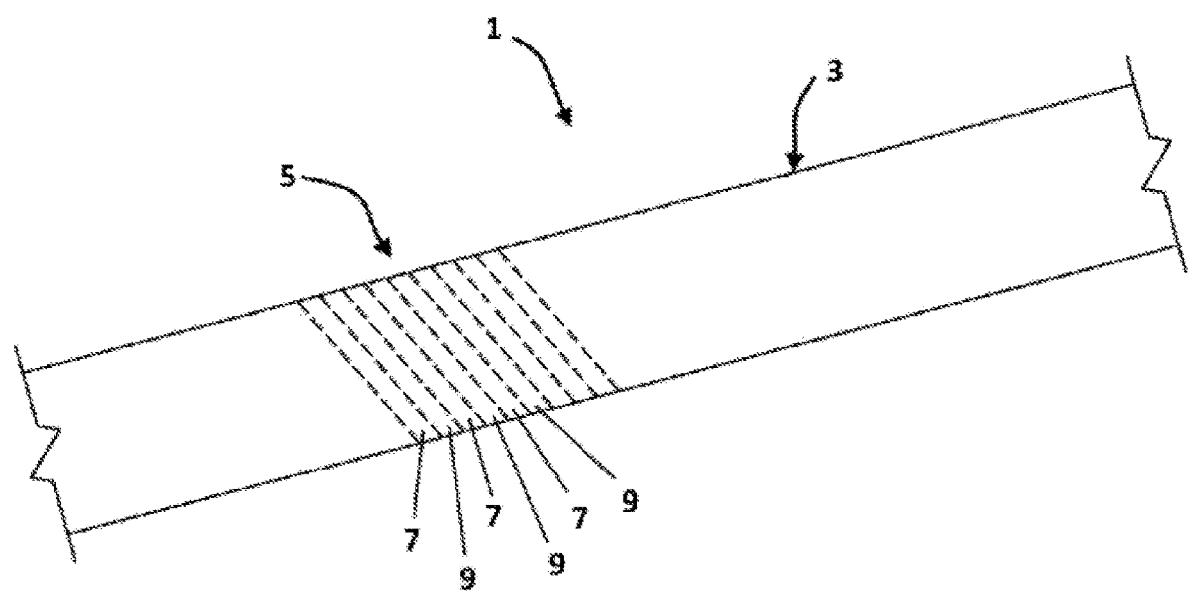
FIG. 1 is a schematic view of an improved tape in accordance with a preferred embodiment of the invention where two adhesives are spaced alternatively in bands of about 2 to 3 mm along the length of the tape.

A novel packaging tape will be described hereinafter. Although the invention is described in terms of specific illustrative embodiment(s), it is to be understood that the embodiment(s) described herein are by way of example only and that the scope of the invention is not intended to be limited thereby.

The tape according to the present invention is adapted to be used in a laminating process, a corrugating process, a press process or any process known in the art where reinforcing a packaging or having an easy open feature for packaging is needed.

The invention relates to an adhesive tape comprising a core structure and an adhesive layer coated at least on one surface defined by the core structure. The adhesive layer comprises at least two different heat-activated adhesive materials located in alternative sequences over said at least one surface of the core structure, the heat-activated adhesive materials being activated at different temperatures.

According to one preferred embodiment, the core structure has the shape of a ribbon, such as those generally used to form an adhesive tape, a mesh or a string. The string can be made of a single or plurality of fibres or yarns.

According to one preferred embodiment, the adhesive layer of the adhesive tape may comprise a plurality of bands of heat-activated adhesive materials, the bands being alternatively spaced over said at least one surface of the core structure.

According to one preferred embodiment, the adhesive tape may be an adhesive tape having its core structure defining two opposite surfaces, and the heat-activated adhesive materials form a plurality of bands. The bands are either alternatively spaced longitudinally across the length over the width of at least one surface of the core structure; or alternatively spaced longitudinally across the width over the length of at least one surface of the core structure.

According to another preferred embodiment, the adhesive tape may an adhesive string having its core structure defining an outer substantially cylindrical surface around a longitudinal axis. The heat-activated adhesive materials then form a plurality of bands alternatively spaced over the outer cylindrical surface either along the longitudinal axis or alternatively around the longitudinal axis.

According to a preferred embodiment, each band of adhesive materials have a width up to 50 mm, preferably from 2 to 3 mm. Other widths can be considered without departing from the invention.

The core structure of the adhesive tape may comprise paper, foil, fabric, plastic film or polymeric yarns, such as polyester yarns, or biaxially oriented polypropylene or polyethylene yarns.

According to a preferred embodiment, the adhesive layer may comprise only two (2) different heat-activated adhesive materials located in alternative sequences on said at least one surface of the core structure. Preferably, one of the heat-activated materials may have a low temperature of activation between 70° C. and 120° C., the other heat-activated material having a high temperature of activation between 75° C. and 125° C., the difference of temperature $\Delta T$ between the two heat-activated materials being about 5° C. Of course, other temperature ranges and $\Delta T$ can be considered and used for the making of the adhesive system without departing from the invention. By "about", it is meant that the value, such as a temperature, can vary within a certain range depending on the margin of error of the method or device used to evaluate such value. A margin of error of 10% is generally accepted.

According to a preferred embodiment, the heat-activated adhesive materials comprise Ethylene-Vinyl-Acetate (EVA) based hot melt adhesives.

According to a preferred embodiment, the adhesive tape has a breaking strength from 80 N to 1000 N.

As aforesaid, the invention is also directed to a process for laminating a substrate using the adhesive tape as disclosed herein. The substrate can be any substrate known in the art of laminating, such as substrates made of cartons, papers, textiles, plastics or the like.

The process comprises the steps of:
a) laminating a tape having a first heat activated adhesive which is activatable at a first temperature and a second heat activated adhesive which is activatable at a second temperature coated in alternating narrow bands at least on one surface of the tape, to a packaging substrate;
b) positioning in or on a laminating machine the tape at a predetermined position over the packaging substrate;
c) heating the tape while contacting the tape with the packaging substrate to form the packaging laminate;
d) cooling the packaging laminate for setting said first heat activated adhesive to provide a first adhesion between the adhesive tape and the packaging substrate; and
e) cutting a predetermined portion of the packaging laminate before a second adhesion occurs between the tape and the packaging laminate when the second heat activated adhesive is set to permanently fix the tape to the substrate.

According to a preferred embodiment, in step c) of the process, the adhesive tape is heated by heat generated by the laminating machine or with an external heat source. Preferably, the external heat source may be a heat wheel or shoe.

In yet another embodiment, in step c) of the process, the adhesive tape is heated at least to the second temperature.

According to a preferred embodiment, in step d) of the process, the laminated substrate is cooled at room temperature when exiting the laminating machine or with an external cooling source. By "room temperature", it is meant a temperature of between about 15° C. and 35° C., more preferably between 25° C. and 32° C.

Examples

Figure 2:
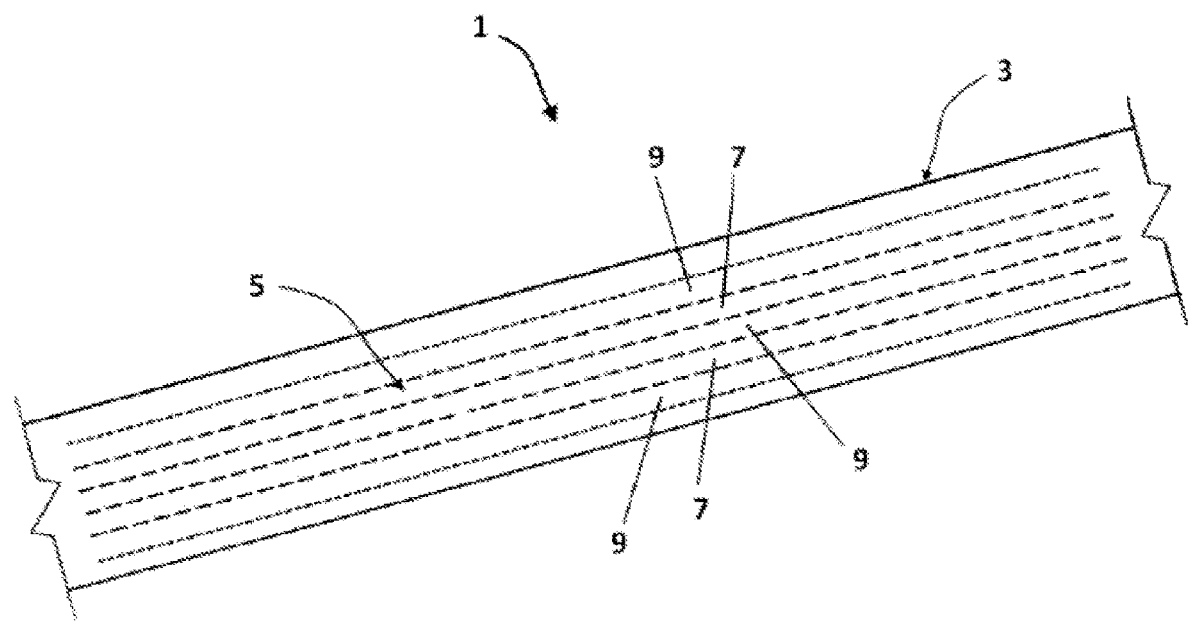
FIG. 2 is a view of an improved tape in accordance with a preferred embodiment of the invention where two adhesives are spaced alternatively in bands of about 2 to 3 mm along the width of the tape.
Figure 3:
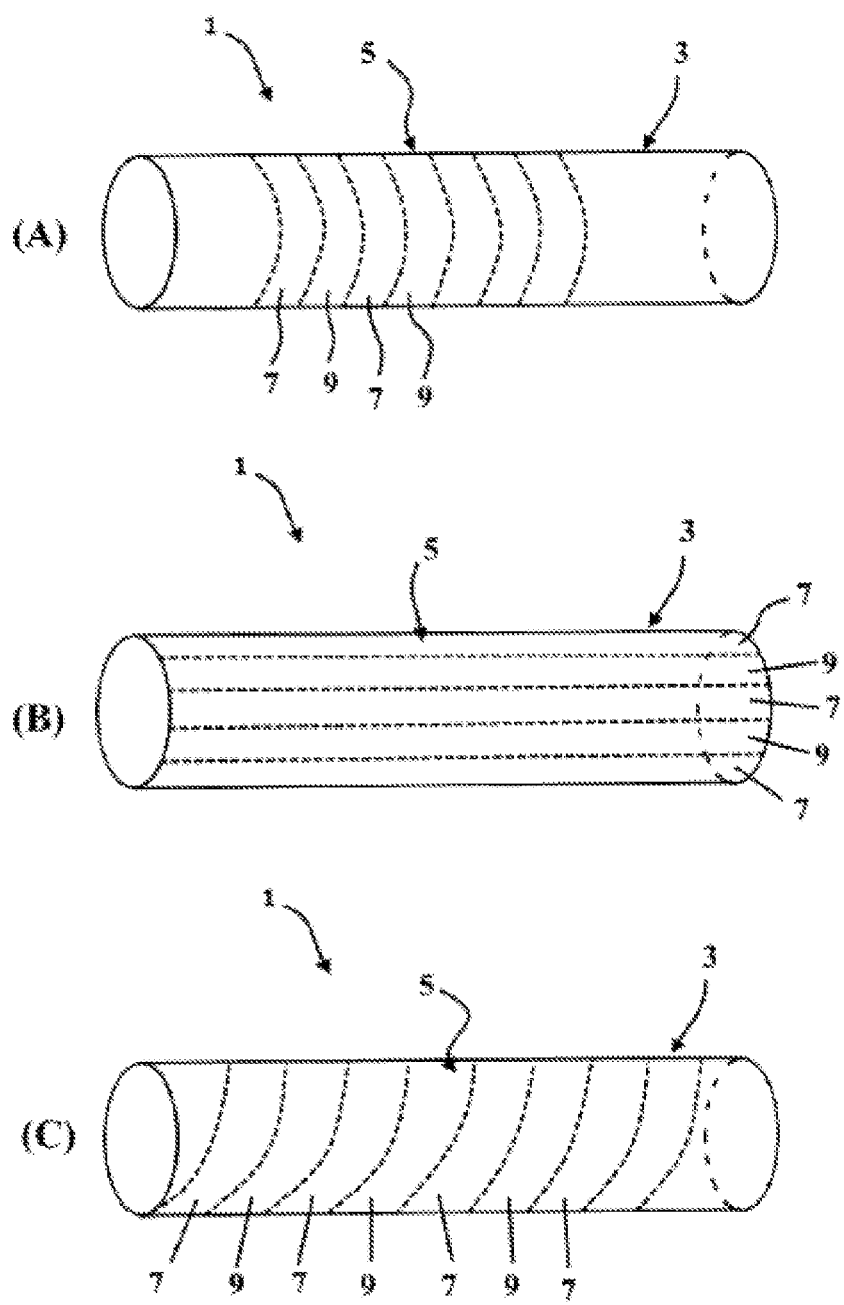
FIG. 3 is a schematic view of an improved string in accordance with preferred embodiments of the invention where two adhesives are spaced alternatively in bands of about 2 to 3 mm: along the circumference of the string forming rings (FIG. 3A), along the length of the string forming bands (FIG. 3B) or along the circumference of the string forming alternated spirals (FIG. 3C).
Figure 4:
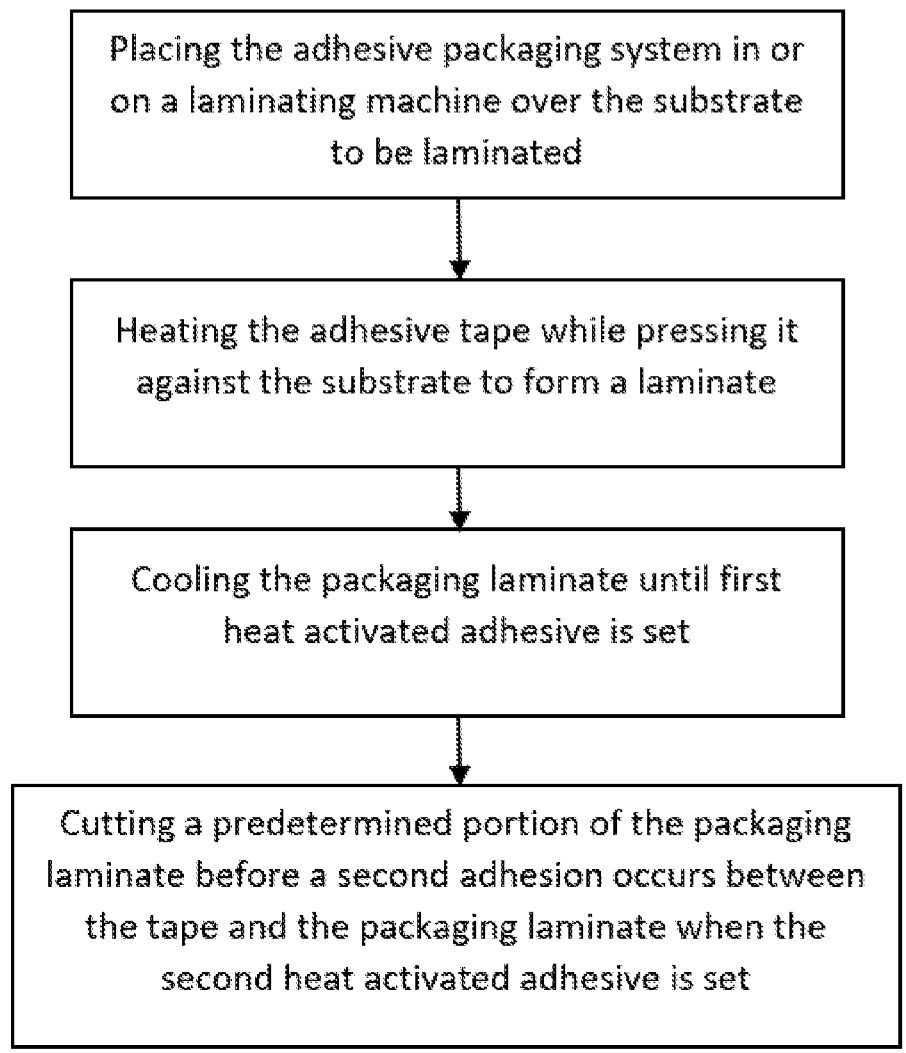
FIG. 4 is a schematic view of the lamination process of a substrate using the adhesive tape as disclosed.

In FIGS. 1 and 2, the adhesive tape 1 is a tape, whereas in FIG. 3, the adhesive tape 1 is a string.

The adhesive tape 1 first comprises a core structure 3. The core structure or core can be made in any materials known in the art for the making of packaging tapes. The core generally comprises a flexible material such as paper, foil, fabric, plastic film or textile yarns (such as polyester yarns, biaxially oriented polypropylene or polyethylene) to provide strength and structure. Core tensile strength, elongation, stiffness, and tear resistance can be matched to the intended use of the tape. The string illustrated on FIG. 3 can be made of one or a plurality of yarns.

The system 1 also comprises an adhesive layer 5 coated at least on one side of the core structure 3.

FIGS. 1 and 2 illustrate a tape 1 where the adhesive layer is only on one side of the core structure. FIG. 3 illustrates a string 1 where the adhesive layer is on the outer surface of the core structure. The adhesive layer 5 comprises at least two different heat-activated adhesive materials 7, 9 located in alternative sequences over the core 3. Preferably, the system 1 comprises two different heat-activated materials as illustrated on the Figures.

For example, the Marotape® from Marotech Inc. is made from a core of Polyester Yarns which are coated with EVA based Hot Melt Adhesives or the Marotape® Plus which is made with a core of Polyester Yarns, coated with EVA based Hot Melt Adhesives and also applied to a backing of Kraft Paper.

Marotech Inc. also provides the Marotap® FPT which is made from a core of Polyester film, coated with EVA based Hot Melt Adhesives, also applied to a backing of Kraft Paper.

As another example, MaroString™ is made from a core of Polyester Yarns which are coated with EVA based Hot Melt Adhesives.

All these Marotape® products are available in a wide range of breaking strengths, widths and hot melt adhesives. The Breaking Strengths can be from 80 N to 1000 N, the widths can be from 2 mm to 50 mm and the Hot Melt Adhesives can have a melting point from 70° C. to 120° C.

According to preferred embodiments, such as those illustrated on FIGS. 1 to 3, the adhesive tape 1 may comprise two different heat-activated adhesive materials 7, 9 located in alternative sequences over the core structure 3.

By "heat-activated adhesive material", it is meant any adhesive that is solid and has little adhesion at room temperature. Once the adhesive has been heated and it reached its melting point, adhesion is activated the adhesion process starts. When the adhesive is cooled down again, the adhesive becomes solid again. In one specific embodiment the heat-activated adhesive material is an Ethylene-Vinyl-Acetate (EVA) base hot melt adhesive, which is common and well known in the art of making adhesives.

The heat-activated adhesive materials being activated at different temperatures. Preferably the temperatures are from a range of 70° C. to 120° C., depending on the laminating process. In one embodiment of the invention, we can use two (2) Hot Melt Adhesives with a difference of melting point of about 5° C., but a smaller or larger gap can be used depending on the physical properties of the laminating process.

As examples of heat-activated adhesive materials that can be used, there are Technomelt®8370 from Henkel Corporation having a melting point de 110° C. and Technomelt®8628 from Henkel Corporation with a melting point of about 105° C. Other known heat-activated adhesive materials known in the art of packaging adhesive systems can be used.

As illustrated on FIG. 1, the heat-activated adhesive materials may form a plurality of bands 7, 9 alternatively spaced longitudinally across the width over the length of at least one surface of the core structure 3. As illustrated on FIG. 2, the heat-activated adhesive materials 7, 9 may form a plurality of bands alternatively spaced longitudinally across the length over the width of at least one surface of the core structure 3. The direction of the band can be either perpendicular to the longitudinal edge of the tape, or parallel thereof. The direction can also be in any directions between these two extreme directions forming an angle between with the longitudinal edge, such as illustrated on FIG. 1, or parallel to the longitudinal edge, such as illustrated on FIG. 2.

FIG. 3 illustrates an improved string 1 in accordance with preferred embodiments of the invention where two adhesives are spaced alternatively in bands 7, 9 of about 2 mm to 3 mm: either along the circumference of the string forming rings (FIG. 3A), along the length of the string forming bands (FIG. 3B), or along the circumference of the string forming alternated spirals (FIG. 3C).

Preferably, each band of adhesive materials has a width of about 2 mm to 3 mm. Of course, the width of the band is to be adapted to the size of the tap and its application.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

What is claimed is:

1. A method for laminating a tape having a first heat activated adhesive which is activatable at a first temperature and a second heat activated adhesive which is activatable at a second temperature being higher than the first temperature, wherein the first heat activated adhesive and the second heat activated adhesive are coated in alternating bands at least on one surface of the tape, to a packaging substrate, the process comprising the steps of:
   a) positioning in or on a laminating machine the tape at a predetermined position over the packaging substrate;
   b) heating the tape at least to the second temperature while contacting the tape with the packaging substrate to form a packaging laminate;
   c) cooling the packaging laminate for setting said second heat activated adhesive to provide a first adhesion between the tape and the packaging substrate; and
   d) cutting a predetermined portion of the packaging laminate before a second adhesion occurs between the tape and the packaging substrate when the packaging laminate is cooled below the first temperature and the first heat activated adhesive is set to permanently fix the tape to the packaging substrate.

2. The method of claim 1), wherein in step 1)b), the tape is heated by heat generated by the laminating machine.

3. The method of claim 1), wherein in step 1)b), the tape is heated with an external heat source.

4. The method of claim 3), wherein the external heat source is a heat wheel or shoe.

5. The method of claim 1), wherein in step 1)c), the packaging laminate is cooled at room temperature.

6. The method of claim 1), wherein in step 1)c), the packaging laminate is cooled with an external cooling source.

7. The method of claim 1), wherein each of the alternating bands has a width of 2 mm to 50 mm.

8. The method of claim 7), wherein each of the alternating bands has a width of 2 mm to 3 mm.

9. The method of claim 1), wherein each of the alternating bands is disposed at an angle to a longitudinal axis of the tape.

10. The method of claim 9), wherein each of the alternating bands is disposed at 90° to the longitudinal axis of the tape.

11. The method of claim 1), wherein each of the alternating bands is parallel to a longitudinal axis of the tape.

12. The method of claim 1), wherein the first temperature is between 70° C. and 120° C., and the second temperature between 75° C. and 125° C.

13. The method of claim 12), wherein the of second temperature is about 5° C. higher than the first temperature.

14. The method of claim 13), wherein the first temperature is about 105° C. and the second temperature is about 110° C.

15. A process for producing a packaging laminate comprising the following steps:
   a) laminating a tape having a first heat activated adhesive which is activatable at a first temperature and a second heat activated adhesive which is activatable at a second temperature being higher than the first temperature, wherein the first heat activated adhesive and the second heat activated adhesive are coated in alternating bands at least on one surface of the tape, to a packaging substrate;
   b) positioning in or on a laminating machine the tape at a predetermined position over the packaging substrate;
   c) heating the tape at least to the second temperature while contacting the tape with the packaging substrate to form the packaging laminate;
   d) cooling the packaging laminate for setting said second heat activated adhesive to provide a first adhesion between the tape and the packaging substrate; and
   e) cutting a predetermined portion of the packaging laminate before a second adhesion occurs between the tape and the packaging substrate when the packaging laminate is cooled below the first temperature and the first heat activated adhesive is set to permanently fix the tape to the packaging substrate.

16. The process of claim 15), wherein each of the alternating bands has a width of 2 mm to 50 mm.

17. The process of claim 16), wherein each of the alternating bands has a width of 2 mm to 3 mm.

18. The process of claim 15), wherein each of the alternating bands is disposed at an angle to a longitudinal axis of the tape.

19. The process of claim 15), wherein the first temperature is between 70° C. and 120° C., the second temperature is between 75° C. and 125° C.

20. The process of claim 19), wherein the second temperature is about 5° C. higher than the first temperature.

* * * * *